(No Model.)

P. SEILER.
LOCOMOTIVE.

No. 457,939. Patented Aug. 18, 1891.

Witnesses,

Inventor
Paul Seiler
By Dewey & Co.
Attys

UNITED STATES PATENT OFFICE.

PAUL SEILER, OF SAN FRANCISCO, CALIFORNIA.

LOCOMOTIVE.

SPECIFICATION forming part of Letters Patent No. 457,939, dated August 18, 1891.

Application filed December 15, 1890. Serial No. 374,809. (No model.)

*To all whom it may concern:*

Be it known that I, PAUL SEILER, a citizen of the United States, residing in the city and county of San Francisco, State of California, have invented an Improvement in Locomotives; and I hereby declare the following to be a full, clear, and exact description of the same.

My invention relates to certain improvements in locomotive-engines whereby the application of power and the effective tractile force of the engine is greatly increased.

It consists in the employment of two sets of wheels of equal diameter, one set running upon the track and the other journaled directly above the first set with their peripheries traveling upon the peripheries of the lower set, the weight of the engine being entirely carried upon the axles of the upper set of wheels. Both sets of wheels are connected together by the usual side rods, and each set is independently connected with the single cross-head, which is reciprocated from the cylinder in the usual manner.

It also consists in certain details of construction, which will be more fully explained by reference to the accompanying drawings, in which—

Figure 1:
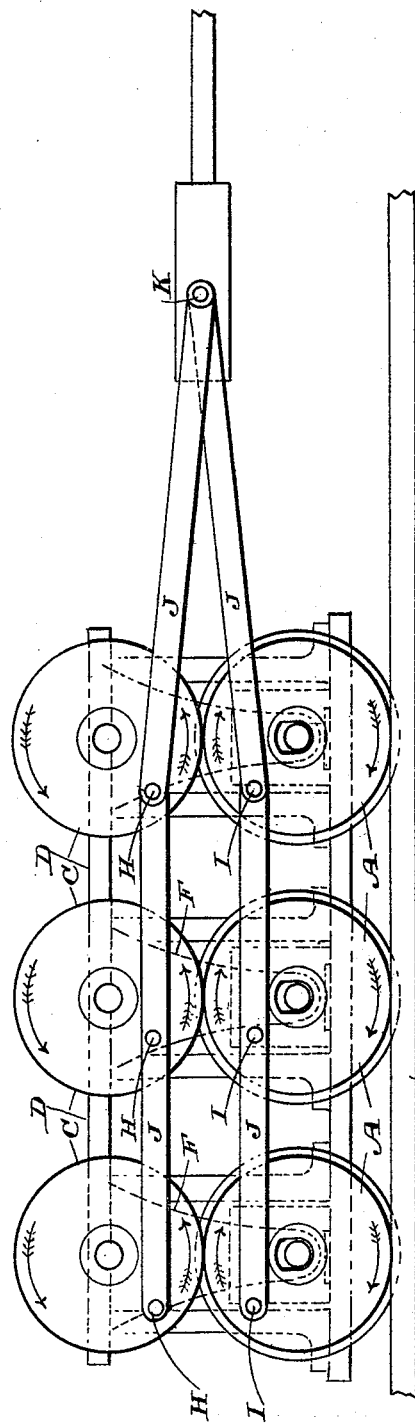
Figure 2:
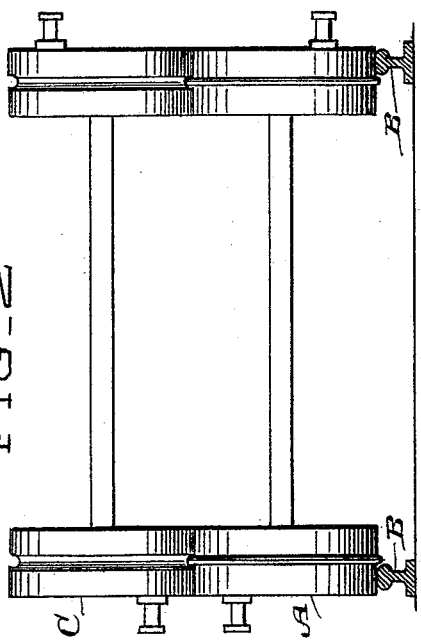

Figure 1 is a side elevation showing the outlines of the wheels, the connecting-rods, and cross-head. Fig. 2 is an edge view of one set of wheels.

A A are the wheels, which are adapted to run upon the track B, and which may be flanged or otherwise suitably constructed for this purpose.

C C is another set of wheels situated exactly above the wheels A and supporting the weight of the machinery and engines by means of the frame D, which has the proper journal-boxes within which the axles of this set of wheels rotate. From this frame-work the jaws F extend downward sufficiently far to receive the journal-boxes of the lower set of wheels A, which are fitted to slide freely within the jaws to allow the wheels such motion as irregularities of surface and other contingencies of the travel require.

Each set of wheels has crank-pins H and I, and these crank-pins are connected together, if there is more than one set of wheels, by the coupling-rods J.

K is a cross-head traveling upon the usual guides and connected by a piston-rod with the piston which reciprocates within the cylinder. (Not here shown.) From this cross-head the connecting-rods L and M extend, respectively, to the crank-pins H and I of one series of wheels, one above and the other below, as shown.

In order to maintain the wheels with their peripheries in perfect contact, it may be found essential to make a groove or channel in the periphery of one set of wheels and a corresponding projecting tongue in the other set, or any other satisfactory construction may be used for this purpose such as will suggest itself to any one skilled in the art. Power being applied through the cylinder to the cross-head, the action will then take place equally upon both sets of wheels, the cranks being alternately in the position nearest to each other and farthest away or upon the opposite sides of the centers of the wheels. When power is applied through a crank to a wheel traveling upon the rails, it will be manifest that when the crank is at the highest part and farthest away from the fulcrum (which is represented by the rail upon which the wheel travels) its power for propulsion is the greatest; but when by a half-revolution it has arrived at a point between the axle and the rail, the leverage becomes such that the least power to move the load can be applied, and the tendency of the wheels to slip upon the rail is at its greatest when the cranks are in this position.

By my construction it will be seen that when the cranks connected with the lower set of wheels are at the lowest point those connected with the upper set of wheels are at the highest point, and are consequently in position to apply the power of that set of wheels to the greatest advantage, while the power is being applied to the lower set of wheels with the least advantage. By reason of the whole of the weight being supported upon the journal-boxes of the upper set of wheels it will be manifest that the weight is transferred through the peripheries of these wheels to the peripheries of the lower wheels, and by a frictional contact the power is transferred to the peripheries of these wheels, thus applying it constantly at a point which is at the greatest distance from the fulcrum.

It will be manifest that the whole of the machinery could be driven by the cranks and connecting-rods of the upper set of wheels, the power being transmitted, as before stated, by frictional contact with the rims of the lower set of wheels; but I have found the construction herein shown to be very satisfactory for the purpose and to greatly increase the tractile power of the engine.

Having thus described my invention, what I claim as new, and desire to secure by Letters Patent, is—

1. In a locomotive, the two sets of wheels, one mounted in vertically-adjusted boxes and traveling upon the track and the other set, of the same diameter, journaled to travel upon the peripheries of the lower set of wheels, journal-boxes in which the axles of the upper wheels revolve and upon which the weight of the engine is carried and transmitted through the upper wheels to the peripheries of the lower wheels, and cranks and connecting-rods whereby the upper set of wheels are united together and connected with the cross-head of the engine, so that power is applied directly to the upper set of wheels, substantially as herein described.

2. In a locomotive, the two sets of wheels, one traveling upon the rails and the other of the same diameter having their peripheries traveling upon the peripheries of the lower set of wheels, the engine-frame, with journal-boxes supported upon the axles of the upper set of wheels, guides extending from said frame downward, and journal-boxes for the lower set of wheels movable vertically within said guides, cranks upon each set of wheels, with connecting-rods uniting them together and connecting each set with the reciprocating cross-head of the engine, substantially as herein described.

In witness whereof I have hereunto set my hand.

PAUL SEILER.

Witnesses:
  S. H. NOURSE,
  H. F. ASCHECK.